United States Patent [19]

Maughan

[11] Patent Number: 5,496,125
[45] Date of Patent: Mar. 5, 1996

[54] COMPRESSION PRE-LOADED BALL AND SOCKET JOINT ASSEMBLY

[75] Inventor: Garth Maughan, Delta, Ohio

[73] Assignee: Dana Corporation, Toledo, Ohio

[21] Appl. No.: 277,714

[22] Filed: Jul. 20, 1994

[51] Int. Cl.⁶ ........................................... F16C 11/06
[52] U.S. Cl. ................... 403/137; 403/133; 403/132; 403/136
[58] Field of Search ........................ 403/128, 129, 403/130, 131, 132, 133, 136, 137, 138, 144, 146, 147

[56] References Cited

U.S. PATENT DOCUMENTS

| | | |
|---|---|---|
| 2,424,431 | 7/1947 | Booth. |
| 2,973,980 | 3/1961 | Vogt et al.. |
| 3,352,583 | 11/1967 | Patton ................................. 403/147 X |
| 3,362,735 | 1/1968 | Maxeiner ................................. 403/132 |
| 3,813,178 | 5/1974 | Herbenar et al. ................... 403/138 X |
| 3,850,443 | 11/1974 | Hassan. |
| 3,951,557 | 4/1976 | Herbenar ................................. 403/138 |
| 4,875,794 | 10/1989 | Kern, Jr. ................................. 403/132 |
| 4,974,985 | 12/1990 | Glatzel ................................. 403/114 |
| 5,011,320 | 4/1991 | Love et al. ................................. 403/132 |
| 5,028,163 | 7/1991 | Krieg et al. ................... 403/132 X |
| 5,067,841 | 11/1991 | Fukukawa et al. ............ 403/140 |

Primary Examiner—Anthony Knight
Attorney, Agent, or Firm—Dykema Gossett

[57] ABSTRACT

A bearing set for a ball and socket joint comprises an outer sleeve with an upper cavity and a lower cavity, each of the cavities defined by an inner skirt, an upper bearing received in the upper cavity and a lower bearing received in the lower cavity. A compression pre-load is applied when each of the bearings is inserted into its cavity, a cylindrical outer wedge surface of the respective bearing having a greater diameter than a corresponding diameter of the corresponding skirt. The bearing set is subjected to additional compression pre-load when the bearing set and ball stud are inserted into a housing and the housing is closed.

14 Claims, 2 Drawing Sheets

5,496,125

COMPRESSION PRE-LOADED BALL AND SOCKET JOINT ASSEMBLY

FIELD OF THE INVENTION

The present invention relates to a ball and socket joint assembly for a wide range of applications, comprising a three-piece bearing set that engages part of a ball stud when retained within a housing under a compression pre-load.

BACKGROUND OF THE INVENTION

Ball and socket joints are used in a variety of applications, including, but not limited to: rack and pinion inner tie rod socket assemblies, steering knuckles, drag links, and connecting rod assemblies. Such joints may typically include a cylindrical housing member adapted to receive a bearing together with a head of a ball stud. The bearing reduces the amount of friction between the housing and the stud while frequently adapting for wear induced looseness between the stud and housing members.

Such joints have several disadvantages. Typically, the stud head must be forced into the bearing, and/or in turn the bearing forced into the socket. Extremely tight tolerances are required. Even with such tolerances, some bearings may crack during assembly, particularly when very rigid, stiff, inelastic materials are used. To reduce cracking, heavier material is often used together with slots within the bearing itself. Load distribution in such slotted bearings typically results in undesirable wear between the various components. Further, the bearings of such joints are adapted for only limited wear, resulting in joint failure as stud head rotating torque decreases and axial end play increases.

SUMMARY OF THE INVENTION

An improved ball and socket joint includes a low profile three-piece high performance plastic annular bearing set that promotes easy joint assembly, results in a joint that is extremely tight with no axial or radial play, but allows necessary ball stud rotation and oscillation, and compensates for wear using a self-adjusting feature related to the release of a compression pre-load within the bearing set. The joint is applicable to a wide range of applications, including rack and pinion inner and outer tie rod socket assemblies, upper and lower suspension ball joint assemblies, drag links and connecting rod assemblies, and other "ball and socket" steering knuckles. The bearing set comprises an outer sleeve, an upper bearing, and a lower bearing.

The sleeve is generally cylindrical, extending about an axis of symmetry. The sleeve includes an upper cavity defined by a first skirt and a lower cavity defined by a second skirt, the cavities being separated by a protrusion that extends radially inward from the skirts.

The upper bearing is received in the upper cavity and the lower bearing is received in the lower cavity. Each bearing comprises a spherical inner seat face that is adapted to engage a head portion of a ball stud, and a generally cylindrical outer wedge surface that is greater than a diameter of the corresponding skirt of the sleeve. Thus, when the bearing is inserted into the sleeve, an interference fit is created that results in a radial compressive pre-load. Such a wedging action allows for a greater range of tolerances among the components. Each bearing also includes a compression rim axially opposite the corresponding bearing seat face. The rim extends axially outward from a corresponding edge of the sleeve, permitting an axial compressive force to each compression rim to provide additional axial compression pre-loading to the bearing set. The axial distance between the rim and edge is limited, however, so that the sleeve may stabilize any pre-load upon the upper and lower bearings.

To apply axial compression pre-load, the bearing set is retained within an annular housing. An outer surface of the sleeve is adapted to conform to an inner surface of the housing. The compression rim of the lower bearing is placed in contact with a floor of the housing and the compression rim of the upper bearing is placed in contact with a sealing washer inserted into the housing, wherein an annular lip of the socket is then crimped over the sealing washer to apply the axial compression pre-load.

The compression pre-loading of the bearing set provides a unique self-adjusting feature to the present invention. As wear takes place, some compression pre-loading of the bearing set is released, while still maintaining zero axial or radial play of the assembled components.

The present invention is easily assembled. An assembly sleeve includes a lower passageway with a radially inner portion that is adapted to receive the shank of the stud. An upper passageway includes a radially inner portion that has a diameter that is greater than that of the lower passageway, forming a ledge between the two passageways. The lower bearing is inserted into the upper passageway so that its compression rim rests upon the ledge. Then the stud is inserted shank first so that the spherical head portion rests against the seat face of the lower bearing. Next, the sleeve is inserted into the passageway. The upper bearing is inserted into the upper cavity of the sleeve and a push pin pressed against the compression rim of the upper bearing to compress the bearing set together. Once the bearing set and stud are assembled, the components are placed in the housing and the annular lips are crimped to apply the final pre-load compression to the bearing set.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
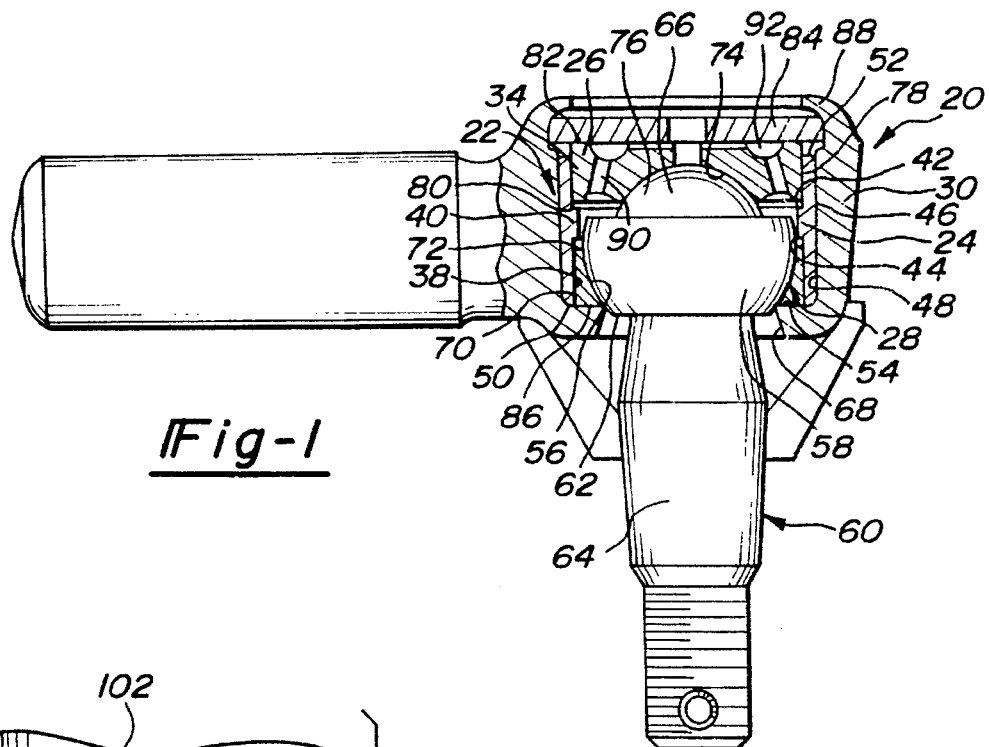
FIG. 1 is a partial cross-sectional view of a ball and socket joint according to the present invention.
Figure 2:
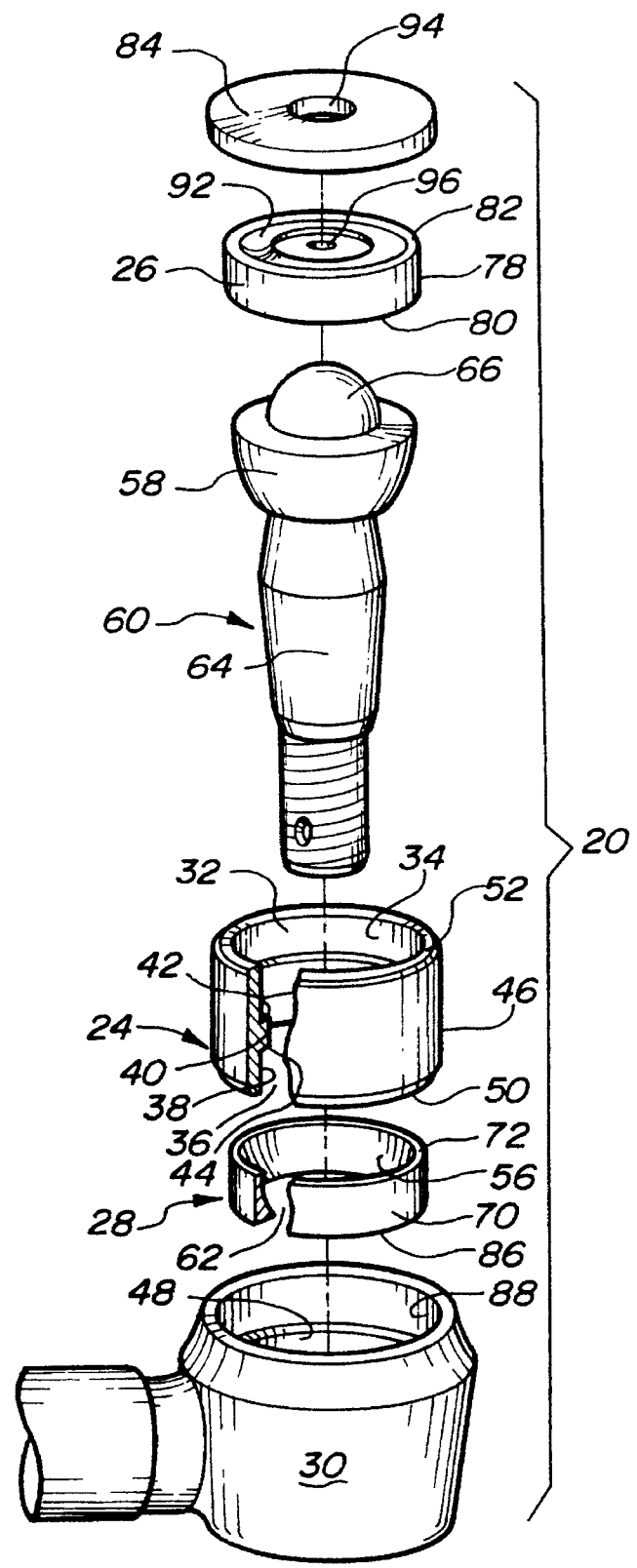
FIG. 2 is an exploded perspective view of the present invention.

A low profile, re-greasable, top closure ball and socket joint 20, illustrated in FIGS. 1 and 2, includes an annular three-piece bearing set 22 comprising an outer sleeve 24, an upper bearing 26, and a lower bearing 28. Bearing set 22 is received within a housing 30.

Sleeve 24 is generally cylindrical, extending about an axis of symmetry, and includes an upper cavity 32 defined by an inner skirt 34 and a lower cavity 36 defined by an inner skirt 38. Cavities 32 and 36 are separated by a protrusion 40 extending radially inwardly from skirts 34 and 38. Protrusion 40 includes an upper ledge 42 and a lower ledge 44. A radially outer surface 46 of sleeve 24 is adapted to closely conform to a radially inner surface 48 of housing 30 along the entire longitudinal length of sleeve 24 from a lower edge 50 to an upper edge 52. Housing 30 includes a floor 54, lower edge 50 of sleeve 24 adapted to contact floor 54.

Lower bearing 28 is received within lower cavity 36 of sleeve 24. Bearing 28 includes a spherical inner seat face 56 to receive a generally spherical base 58 of a modified half-ball stud 60 and an aperture 62 to receive a stud shank 64 of ball stud 60. Head 66 extends axially away from base 58. Together, base 58 and head 66 form a stud head portion of stud 60. After assembly, shank 64 passes through an aperture 68 in floor 54 of housing 30. A generally cylindrical outer wedge surface 70 of lower bearing 28 has a diameter that is greater than a corresponding diameter of skirt 38. Thus, when lower bearing 28 is inserted into sleeve 24, a mild to moderate interference fit results in a wedging action between surface 70 and skirt 38 to create a compression pre-load. Such a wedging action permits greater tolerances and more variation in assembly tolerance stack-ups. To aid in the insertion of lower bearing 28 into cavity 36, an upper edge 72 of bearing 28 and lower edge 50 of sleeve 24 are chamfered or radiused slightly.

Upper bearing 26 is received within upper cavity 32 of sleeve 24. Bearing 26 includes a spherical inner seat face 74 to receive head 66 of stud 60. Face 74 may include a plurality of lube grooves 76 that are preferably equispaced. A generally cylindrical outer wedge surface 78 of upper bearing 26 has a diameter that is greater than a corresponding diameter of skirt 34. While surface 78 and skirt 34 may have mating frusto-conical shapes, this is generally not preferred. If non-cylindrical surfaces are used, upper bearing 28 may become wedged within sleeve 24 before face 74 engages head 66, resulting in undesirable play in joint 20. This does not happen if wedge surface and inner skirt are both cylindrical. Thus, when upper bearing 26 is inserted into sleeve 24, a wedging action or radial compression pre-load results that is similar to that between sleeve 24 and lower bearing 28. To aid in the insertion of upper bearing 26 into cavity 32, a lower edge 80 of bearing 26 and upper edge 52 of sleeve 24 are chamfered or slightly radiused. Upper bearing 26 imay be adapted to engage head 66 before edge 80 contacts ledge 42 of protrusion 40 unless the application requires nearly seating sleeve edge 50 against housing floor 54 such as when a maximum radial support surface is desired.

Upper bearing 26 includes a compression rim 82 that is adapted to engage a sealing washer 84. Similarly, lower bearing 28 includes a compression rim 86 that is adapted to engage floor 54. After assembly, face 56 of lower bearing 28 and face 74 of upper bearing 26 engage and secure stud 60, limiting its degrees of freedom to rotational and oscillation motions about a common center point.

A cross-sectional view of the assembled joint 20 is illustrated in FIG. 1. The joint is sealed by closing housing 30. Housing 30 is typically a forging or a casting, but may also be a machining. An annular lip 88 of housing 30 is crimped about sealing washer 84. Lip 88 is sized to ensure adequate resistance against severe loading "push out." Further, when housing 30 is closed, a compressive axial load is applied to sealing washer 84 which is transferred to compression rim 82 of upper bearing 26. A gap typically exists between edge 52 of sleeve 24 and sealing washer 84 to prevent a portion of the compressive load from being transferred to the sleeve. Simultaneously, an axial load is applied by floor 54 of housing 30 to compression rim 86 of lower bearing 28. The axial loading provides additional compression pre-load to bearing set 22. In the illustrated embodiment, before the axial load is applied, compression rim 82 of upper bearing 26 preferably extends axially outward approximately 0.03 in. (0.7 mm) from upper edge 52 of sleeve 24. Similarly, compression rim 86 of lower bearing 28 extends axially outward approximately 0.03 in. (0.7 mm) from lower edge 50 of sleeve 24.

After load application, compression rims 82 and 86 preferably extend axially outward between 0.015 in. (0.4 mm) and 0.025 in. (0.6 mm) from the corresponding edges of sleeve 24.

While compression rims 82 and 86 must extend a short axial distance beyond the edges of sleeve 24, this distance is preferably small so that sleeve 24 may stabilize any pre-load upon bearings 26 and 28, allowing bearing set 22 to act as a "cylindrical wedge." Such a configuration provides stability for the joint under high axial and radial loading conditions while resisting rotating torque loss.

The axial compression pre-load is carried over face 74 of upper bearing 26 and transferred through head 66 and base 58 to corresponding face 56 of lower bearing 28. Approximately 84 percent of the available surface area of base 58 and head 66 is preferably adjacent face 56 or face 74, respectively, to provide an optimal load distribution area. The load is then transferred from lower bearing 26 to housing 30.

The radial compression pre-load is carried between outer wedge surface 70 of lower bearing 28 and skirt 38, and between outer wedge surface 78 of upper bearing 26 and skirt 34. Under certain situations part of the radial load may be borne between radially outer surface 46 of sleeve 24 and radially inner surface 48 of housing 30, particularly if sleeve 24 is slotted longitudinally from lower edge 50 to upper edge 52.

Either one or both of bearings 26 and 28 may be semi-rigid, allowing constant self-adjustment (or "take up") for wear, however small, occurring over base 58 or head 66, as well as faces 56 and 74 of bearings 28 and 26, respectively. As wear takes place, some compression pre-loading of the bearings is released while still maintaining zero axial or radial play of the bearing 26, bearing 28, base 58, and head 66 within housing 20. Thus, joint 20 can resist high radial and axial load forces over an extended life, using elements that are less sensitive to variations in tolerance, and produced at lower cost with a lower weight than known prior art joints.

Joint 20 has a low profile applicable to a wide range of applications, including, but not limited to, rack and pinion inner and outer tie rod assemblies, upper and lower suspension ball joint assemblies, drag links and connecting rod assemblies, and other "ball and socket" steering knuckles. Sleeve 24 and bearings 26 and 28 may be formed from a wide range of materials, depending on the individual application and the appropriate internal assembly force retention required during joint usage. While a high performance plastic bearing set 22 is generally envisioned, possible semi-rigid bearing materials include polyethylene terephthalate, sold under the trade name "ERTALYTE"; aramid aromatic polyamide polymer fiber, sold under the trade name "KEVLAR," and combined with 6,6 polyamide, sold under the trade name "NYLON," and resulting in a product sold under the trade names "HYDLAR" or "KEVLAR-NYLON"; 6,6 polyamide, sold under the trade name "NYLON," and combined with a lubricant such as molybdenum disulfide, and sold under the trade names "NYLATRON" and "MDS NYLON"; polyformaldehyde (polyacetal) polymer in oxymethylene linear structure with attached ester or ether terminal groups and sold under such trade names as "DELRIN" and "CELCON"; linear, amorphous polyester (polycarbonate), sold under such trade names as "LEXAN" and "HYZOD"; polymerized acrylonitrile-butadiene-styrene, sold under the trade name "ABS"; linear polyurethane elastomer in a high density, 75 "Shore D" hardness range, sold under the trade name "POLYURETHANE"; ultrahigh molecular weight polyethylene, sold under the trade name "UHMWPE"; chlorinated-polyvinyl-chloride, sold under the trade name "CPVC"; ethylene-hexene-1 copolymer, sold under the trade name "MARLEX"; polytetrafluoroethylene (filled), sold under the trade name "RULON"; polypropylene (polyolefin); and polyformaldehyde polymer filled with polytetrafluoroethylene fibers, sold under the trade name "DELRIN-AF."

Joint 20 includes lubricant to maintain the very low wear integrity of joint 20. Lube grooves 76 work in combination with passages 90 and an annular groove 92 to hold and transmit the lubricant. Sealing washer 84 includes an aperture 94 and upper bearing 26 includes an aperture 96 that is adapted to receive a grease fitting (not shown) to provide re-greasing and prevent lubricant leakage. Apertures 94 and 96 may be omitted for a lubed-for-life joint application.

Joint 20 is extremely economical to produce, requiring less costly components and producing less scrap. Further, the interaction between the elements permits more consistent processing while still allowing for greater tolerance variations. The use of radial and axial pre-loading results in consistent zero end play and moderate torque in a very low wear assembly. Less maintenance is required for joint 20 when compared to known prior art assemblies. Frequent lubrication is not required. In some applications, a lubed-for life joint may be appropriate.

Figure 3:
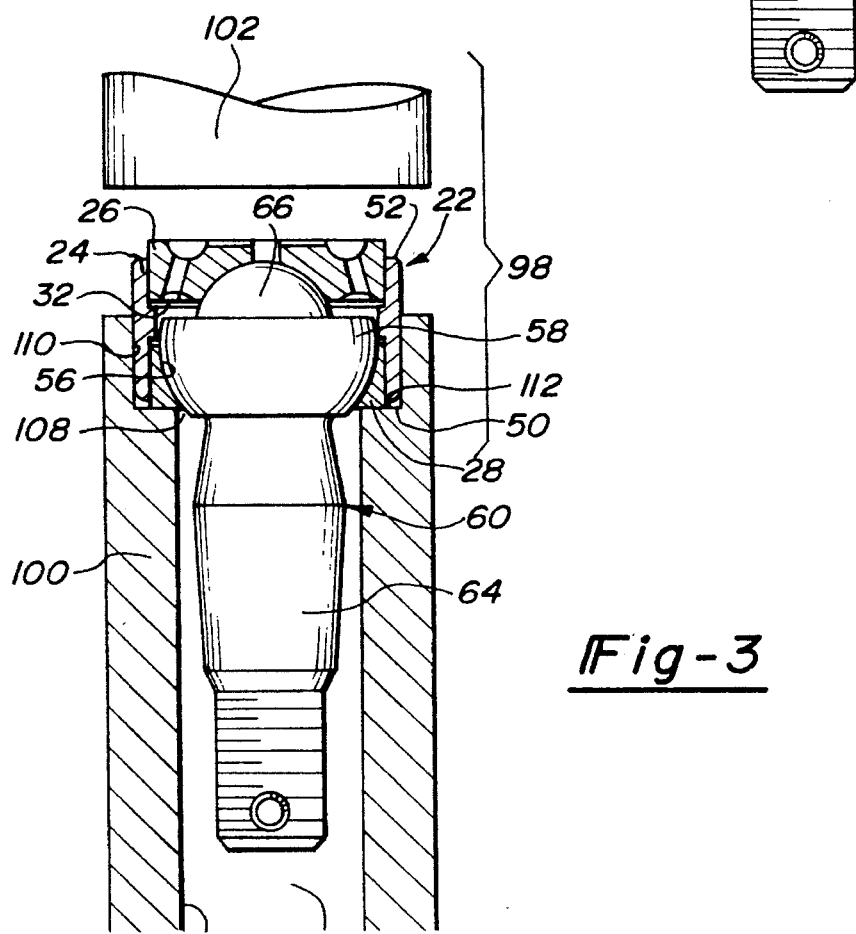
FIG. 3 is a partial cross sectional view showing a method of assembly of the bearing set and stud of the present invention using an assembly sleeve and push pin.

The assembly of bearing set 22 is illustrated in FIG. 3 using a compressing device 98 comprising an assembly-sleeve 100 and a push pin 102. Assembly-sleeve 100 includes a lower passageway 104 with a radially inner portion 106 that is adapted to receive shank 64. An upper passageway 108 includes a radially inner portion 110 that has a diameter greater than that of passageway 100, the diameter being slightly greater than radially outer surface 46 of sleeve 24. First, bearing 28 is inserted into passageway 108 such that compression rim 86 rests upon a ledge 112, formed in a transition zone between passageways 104 and 108. Then stud 60 is inserted shank first, so that base 58 rests against face 56 of lower bearing 28. Next, sleeve 24 is inserted into passageway 100. Once upper bearing 26 is placed into cavity 32 of sleeve 24, push-pin 102 is used to compress the various components together, securing stud 60 within assembled bearing set 22. Then stud 60 and bearing set 22 are placed in housing 30, and lips 88 crimped to seal the joint and apply the final pre-load compression to bearing set 22. To assist in the assembly of the bearings 26 and 28 into sleeve 24, it may be desirable to create a slot along the axial length of sleeve 24 from lower edge 50 and upper edge 52. If such a slot is used, however, the radial pre-load of bearing set 22 occurs when the bearing set is placed in housing 30.

A preferred embodiment of the present invention has been described. It is to be understood that variations and modifications may be employed without departing from the scope of the present invention. Accordingly, the following claims should be studied to learn the true scope of the present invention.

What is claimed is:

1. A bearing set for a ball and socket joint comprising:

a generally cylindrical sleeve extending about an axis of symmetry, said sleeve including at least one cavity defined by an inner skirt;

a first bearing received in a first portion of said sleeve, said first bearing including a first spherical inner seat face and a generally cylindrical outer wedge surface, a diameter of said outer wedge surface of said first bearing being greater than a corresponding diameter of said skirt such that a pre-load results between said sleeve and said first bearing; and a second bearing received in a second portion of said sleeve, said second bearing including a second spherical inner seat face and a generally cylindrical outer wedge surface, a diameter of said outer wedge surface of said second bearing being greater than a corresponding diameter of said skirt such that a pre-load results between said sleeve and said second bearing, said first and second faces in facing relationship to one another.

2. A bearing set as recited in claim 1, wherein said sleeve includes an upper edge and a lower edge, at least one of said first and second bearings including a compression rim that extends axially outward from one of said upper edge and said lower edge, such that a compressive axial force may be applied to said compression rim to provide additional compression pre-load to the bearing set.

3. A bearing set as recited in claim 2, wherein said compression rim extends axially outward between 0.015 in. and 0.025 in. from said one of said upper edge and said lower edge.

4. A bearing set as recited in claim 1, wherein said sleeve includes an upper cavity defined by a first skirt and a lower cavity defined by a second skirt, said first and second cavities separated by a protrusion that extends radially inward from said first and second skirts.

5. A bearing set as recited in claim 1, wherein at least said first and second bearings comprise semi-rigid bearing material.

6. A ball and socket joint comprising:

a housing with a generally cylindrical inner surface;

an annular sleeve disposed within said housing, said sleeve including an outer surface adapted to conform said an inner surface of said housing, said sleeve including at least one cavity defined by an inner skirt;

a first annular bearing received in a first portion of said sleeve, said first bearing including a first generally spherical inner seat face, an aperture centered in said first face and an outer wedge surface, a diameter of said outer wedge surface being greater than a corresponding diameter of said skirt such that a pre-load results between said sleeve and said first bearing;

a ball stud with a generally spherical stud head portion and a shank, said shank passing through said aperture of said first bearing and said spherical stud head portion engaging said first face;

a second annular bearing received in a second portion of said sleeve, said second bearing including a second generally inner seat face engaging said spherical stud head portion, and an outer wedge surface, a diameter of said outer wedge surface of said second bearing being greater than a corresponding diameter of said skirt such that a pre-load results between said sleeve and said second bearing; and closure means to retain said bearings, said sleeve and said stud head portion within said housing.

7. A ball and socket joint as recited in claim 6, wherein said closure means includes a sealing means placed in initial facial contact with one of said first and second bearings with the other of said first and second bearings in facial contact with a floor of said socket.

8. A ball and socket joint as recited in claim 7, wherein at least one of said first and second bearings includes a compression rim that extends axially outward from an axial edge of said sleeve, such that an axial force applied by said sealing means provides additional compression loading to said at least one of said first and second bearings.

9. A ball and socket joint as recited in claim 8, wherein said sealing means is held in position by an annular lip of said housing.

10. A ball and socket joint as recited in claim 8, wherein each of said first and second bearings includes a compression rim.

11. A ball and socket joint as recited in claim 8, wherein said compression rim extends axially outward between 0.015 in. and 0.025 in. beyond said edge of said sleeve before said axial force is applied.

12. A ball and socket joint as recited in claim 7, wherein said sealing means comprises a sealing washer.

13. A ball and socket joint as recited in claim 6, wherein said sleeve includes an upper edge and a lower edge, at least one of said first and second bearings including a compression rim that extends axially outward from one of said upper edge and said lower edge, such that an axial force may be applied to said compression rim to provide additional compression pre-load.

14. The method of assembling a bearing set, comprising the steps of:

inserting a first annular bearing with an inner spherical seat face and a compression rim axially opposite said face into an assembly sleeve that includes a lower passageway and an upper passageway, the diameter of said upper passageway being greater than that of said lower passageway, said compression rim of said first bearing resting on a ledge formed between said upper and lower passageways;

inserting a ball stud with a spherical stud head portion and shank into said assembly-sleeve such that said stud head portion rests upon said first face and said shank is placed in said lower passageway;

positioning an annular sleeve between an outer surface of said first bearing and an inner wall of said assembly sleeve, an inner skirt of said sleeve having a slightly smaller diameter than said outer surface of said bearing to create an interference fit;

inserting a second bearing into said sleeve, said second bearing including a second inner spherical seat face, a compression rim axially opposite said second face, and an outer diameter slightly greater than a said diameter of said skirt to create an interference fit, said second face adapted to engage said spherical stud head portion;

placing a push-pin in facial contact with said compression rim of said second bearing; and compressing axially the bearing set to force said first and second bearings into said sleeve, retaining said spherical head portion of said stud and creating a radial compression pre-load.

* * * * *